Oct. 28, 1958
R. H. ROSBACK
2,857,887
FLUID PRESSURE SERVO-MOTOR
Filed May 2, 1956
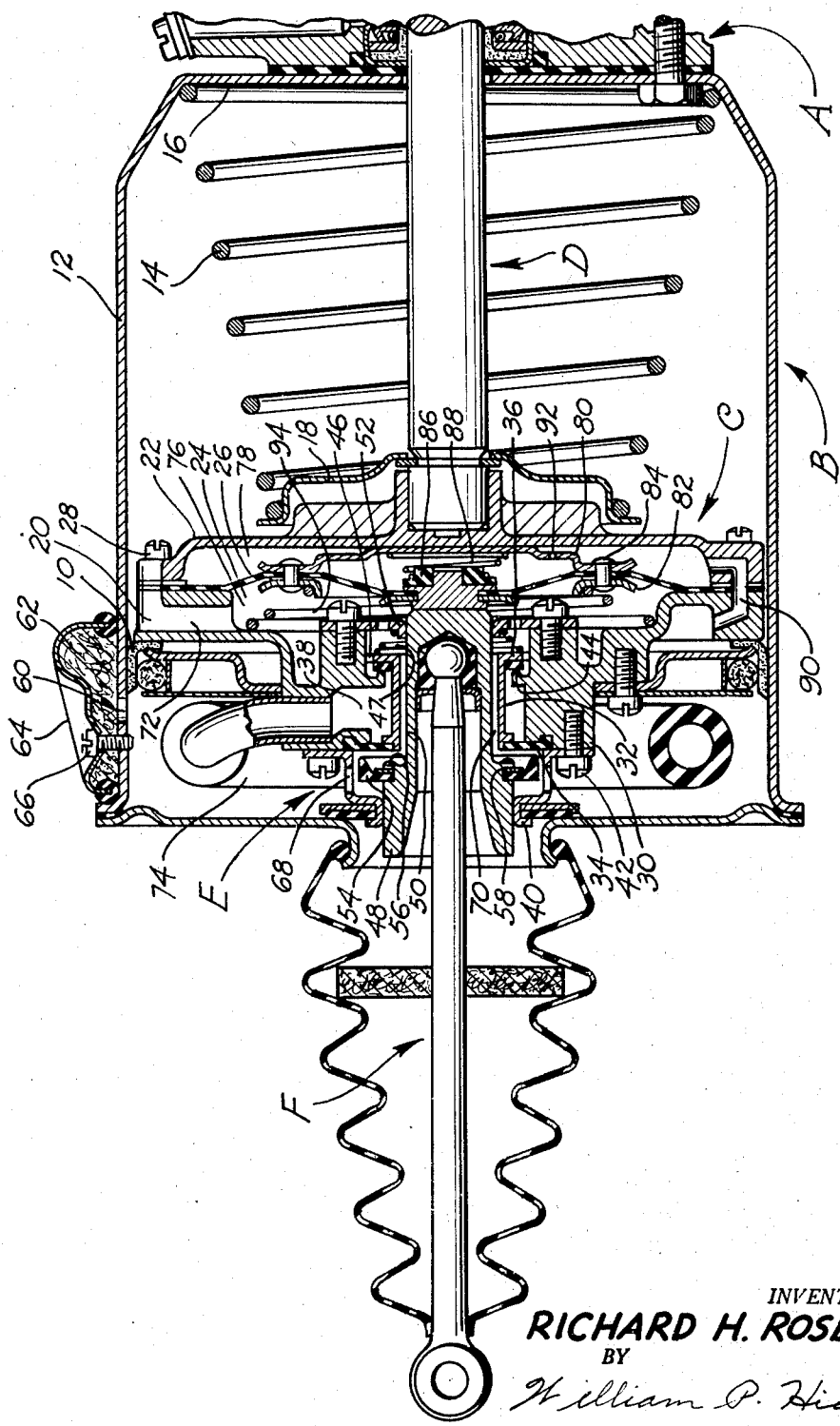
INVENTOR.
RICHARD H. ROSBACK
BY
William P. Hickey
ATTORNEY.

United States Patent Office 2,857,887
Patented Oct. 28, 1958

2,857,887
FLUID PRESSURE SERVO-MOTOR

Richard H. Rosback, South Bend, Ind., assignor to Bendix Aviation Corporation, South Bend, Ind., a corporation of Delaware Application May 2, 1956, Serial No. 582,093

6 Claims. (Cl. 121—46.5)

The present invention relates to valving generally, and more particularly to the type of valving adapted to be used in fluid pressure servo-motors and the like.

An object of the invention is the provision of new and improved substantially balanced valving for fluid pressure servo-motors and the like which is inexpensive to manufacture, rugged in its construction, and efficient in its operation.

Another object of the present invention is the provision of new and improved valving in which a movable chamber partition member is positioned in a valve chamber in such manner as to separate a first pressure chamber from a control pressure chamber, said movable chamber partition member comprising a movable wall portion connected to valve means adapted to control communication between said pressure chambers; said valving also including a control member adapted to close off at least a portion of said movable wall from a third pressure chamber while continuing to expose at least a portion of said movable wall to said control pressure chamber, and whereby the last mentioned portion of the movable wall opposes forces across said valve means to produce a valve balancing effect.

The invention resides in certain constructions and combinations and arrangement of parts, and further objects and advantages will become apparent to those skilled in the art to which the invention relates from the following description of the preferred embodiment described with reference to the accompanying drawing forming a part of this specification, and in which:

The unitary figure of the drawing is a cross sectional view of a pneumatic fluid pressure servo-motor of the type adapted to operate the brakes of an automotive vehicle; and which servo-motor embodies principles of the present invention.

The unit shown in the drawing generally comprises a hydraulic master cylinder A (of well known construction and only a portion of which is shown) attached to one end of a vacuum powered fluid pressure servo-motor B containing a power piston C adapted to receive one end of the fluid displacement member D and force it into the master cylinder A. Operation of the unit is controlled by valve structure E mounted upon the piston C; which valve structure is in turn actuated by the foot pedal lever (not shown) of the vehicle through push rod F.

The hydraulic master cylinder A is of well known construction and will not be further described. For more complete details of its construction and operation, see the Earl R. Price et al. application Serial No. 513,514.

The vacuum powered fluid pressure servo-motor B is an atmospheric suspended unit in which atmospheric pressure normally exists on both sides of its power piston C, and actuation of the piston C is accomplished by admitting vacuum to its rearwardly positioned side. The outer edge of the piston C is provided with a pneumatic seal 10 slidably engaging the side walls 12 of the servo-motor, and the piston C is biased to its normal brake releasing forward position shown in the drawing by means of a coil spring 14 positioned between the rearward end 16 of the servo-motor and a spring abutment plate 18 suitably affixed to the fluid displacement member D.

Power piston C is formed by means of front and rear sections 20 and 22, respectively, to provide an internal piston or diaphragm chamber 24 containing a diaphragm 26—the outer edges of which are clamped between sections 20 and 22 as by machine screws 28. The front section 20 of the piston C is provided with a forwardly extending boss 30 which houses the previously referred to control valve structure E.

The valve structure E comprises an annular sleeve or spool-like member 32 positioned within the annular boss 30 and having radially outwardly extending flange portions 34 and 36 adjacent its opposite ends—which flange portions engage the boss 30 to form a first annular valve chamber 38 which in the present instance is supplied with vacuum. The front flange portion 34 in effect forms a movable wall with respect to the side walls of the vacuum chamber and is made from a flexible rubber material vulcanized onto the annular sleeve 32; and the radially outer edge of the flange 34 is sealingly clamped to the front face of the boss 30 by means of a retaining plate 40 and machine screws 42. The rear flange portion 36 is made from a radially turned portion of the sleeve 32 and is coated with a resilient material for engagement with an annular valve seat 44 projecting radially inwardly from the side edges of the boss 30. The front end of the sleeve or spool-like member 32 is maintained in position by the above described flange 34 and the rear end of the sleeve 32 is maintained in position by projections 46 on the rear flange 36 which slidably engage the side walls of the boss 30 rearwardly of the valve seat 34. A light spring 47 is used to insure proper seating of flange 36 upon valve seat 44.

The valve structure E also comprises an axially movable generally cylindrically shaped control member 48 which extends through the sleeve 32 and which is suitably affixed to the push rod F for actuation thereby. The center portion 50 of the control member 48 is considerably smaller than the opening through the annular sleeve 32 to provide for the free passage of air therebetween, and the front and rear ends of the control member 48 are guided for reciprocatory movement by means of the retaining plate 40 and guide plate 52, respectively. Atmospheric pressure continually exists in the space forwardly of the piston C—which may be considered to be a second valve chamber that is supplied with a pressure differing from that in the first valve chamber, and which in the present instance is the atmosphere; and the flow of air pressure to the space between the first and second valve chambers—which may be considered to be the valve's control chamber, is controlled by an atmospheric poppet on the control member 48. The atmospheric poppet 54 comprises a radially extending cup-shaped flange portion suitably affixed to the control member 48 and the outer edges of which extend rearwardly for engagement with the diaphragm 34. In the preferred embodiment shown, the flanged portion of the poppet 54 is made from a flexible material such as rubber and is constructed to engage the portion of the diaphragm 34 adjacent its fixed side edges. In the embodiment shown, the outer edges of the atmospheric poppet 54 first engage the diaphragm 34 upon rearward movement of the valve control member 48 to close off atmospheric communication with the valve's control chamber; and thereafter flexure of the atmospheric poppet 54 is utilized to permit a plurality of projections 56 on the control member 48 to engage the sleeve 32 and move it rearwardly. It will be noted that considerable space exists laterally between the projections 56 to permit the free passage of air at all times, thereby maintaining the same pressure within the cup shaped atmospheric poppet 54 as exists in the valve's control chamber. Rearward movement of the sleeve 32 forces the rear flange 36 out of engagement with the vacuum seat 44 to permit vacuum communication with the control chamber, and thereby actuate the servo-motor. Partial vacuum in the control chamber causes the seated poppet 54 to more firmly engage the diaphragm 34. De-energization of the servo-motor is brought about by forward movement of the control member 48, whereupon a back-up washer 58 positioned against the rear side of the atmospheric poppet 54 forces the poppet out of engagement with the diaphragm 34 to permit atmospheric communication with the rear side of the power piston C.

Atmospheric pressure is continually fed to the front side of the piston C through opening 60 in the side walls 12. Filter material 62 is supported over the opening 60 by means of retaining plate 64 and machine screws 66 to prevent the entrance of dirt and water to the servo-motor. Atmosphere poppet 54 is normally maintained forwardly of the sleeve 32 to permit air pressure from the front side of the piston to flow through opening 68 in the retaining plate 40, annular space 70 of the control valve structure, internal diaphragm chamber 24, and piston passageway 72 to reach the rear side of the piston C, thereby establishing the normal atmospheric suspended condition of the servo-motor. Actuation of the servo-motor is produced by depressing the foot pedal lever of the automotive vehicle, whereupon the atmospheric poppet 54 is forced into engagement with the diaphragm 34 of the spool member 32 to close off atmospheric communication between opposite sides of the piston C. Vacuum is continually supplied to the annular vacuum chamber 38 from a point outside the servo-motor by means of flexible tube 74, and continued inward movement of the valve control member 48 causes the projections 56 of the control member to abut the spool member 32 to move its rear flange portion 36 out of engagement with the vacuum valve seat 44. Vacuum is thereupon communicated with the rear side of the power piston C through the internal piston chamber 24 and piston passageway 72, and the piston C is caused to move rearwardly to displace fluid from the master cylinder A.

The servo-motor B is of a type adapted to provide "feel" or a reactive force opposing valve actuating movement to indicate to the operator the amount of force delivered by the unit. This is accomplished in the unit shown in the drawing by means of diaphragm 26 which divides the internal piston chamber 24 into forwardly and rearwardly opposed diaphragm chambers 76 and 78, respectively. The diaphragm 26 is designed to deliver its reactive force to the control member 48 in two stages. The first or initial stage of the diaphragm reaction is produced by engagement of its center portion with the valve control member 48, and is intended to simulate the forces normally required to bring the brake shoes of an automotive vehicle into engagement with their brake drums. The second or major stage of the diaphragm's reaction is produced by the combined effect of the inner and outer portions of the diaphragm, and is intended to provide a reaction generally proportional to the forces being delivered by the servo-motor. The diaphragm 26 is divided into its primary and secondary portions by means of a center plate 80 fastened to the back side of the diaphragm by means of an annular retaining ring 82 and through rivets 84. The center portion of the diaphragm is provided with a centrally located button 86 biased into engagement with the valve control member 48 by means of a coil spring 88 interpositioned between the button and the center plate 80. Atmospheric pressure is continually communicated to the rearwardly positioned opposed diaphragm chamber 78 by piston passageway 90 and thence to the back side of the diaphragm's center portion by means of opening 92 in the center plate 80.

Rearward movement of the valve control member 48 causes the rear flange portion 36 of the annular sleeve 32 to be moved out of engagement with its vacuum valve seat 44 thereby admitting vacuum to the forwardly opposed diaphragm chamber 76 to produce a differential pressure across the diaphragm. A counter reaction spring 94 of predetermined strength biases the center plate 80 into engagement with the rear surface of the internal piston chamber 24 to initially hold the center plate 80 out of engagement with the button 86. During the initial stage of pressure differential build-up across the diaphragm, only forces exerted on the center or primary diaphragm are transmitted through the button 86 to the valve control member 48. When sufficient vacuum has been introduced to the forwardly opposed diaphragm chamber 76 to overcome the effect of the outer reaction spring 94, center plate 80 moves into engagement with the diaphragm button 86 to produce a combined effect of both portions of the diaphragm upon the control member.

Release of the vehicle brakes is accomplished by retraction of the foot pedal lever, whereupon coils spring 88 in conjunction with the forces exerted upon the diaphragm 26 move the control member 48 forwardly. Forward movement of the control member 48 moves the projections 56 forwardly permitting the rear flange portion 36 of the spool member 32 to again abut the vacuum valve seat 44. Further retraction of the foot pedal lever permits the projections 56 to separate from the spool member 32 and thereafter causes the back up washer 58 to separate the atmospheric poppet 54 from the diaphragm 34. This, of course, permits air pressure to enter the control chamber of the valve, and to thereby be communicated to the rear side of the power piston C, forcing the piston forwardly to release the brakes. If forward movement of the control member 48 is stopped before power piston C reaches its most forwardly position, the piston C will again move the diaphragm 34 into engagement with the atmospheric poppet 54 preventing further atmospheric flow to the rear side of the power piston C, and thereby preventing further forward movement of the piston. Complete retraction of the control member 48, of course, permits the atmospheric poppet 54 to remain forwardly of the diaphragm 34 permitting the servo-motor to resume its normal atmospheric suspended condition previously described.

While the preferred embodiment has been described as utilizing a diaphragm for the front flange portion of the spool shaped member, it will be apparent that other types of movable wall may be utilized, as for example a generally rigid flange provided with a sliding seal with respect to the internal walls of the vacuum chamber. It will also be apparent that the invention need not be limited to an atmospheric poppet which engages the generally stationary or fixed portion of the diaphragm adjacent the side walls of the valve chamber, so long as a portion of the movable wall is positioned within the seating surface of the atmospheric poppet to provide a balancing effect for the spool member 32. Were the atmospheric poppet made to engage a movable portion of the spool member's front flange portion it will be apparent that the atmospheric poppet need not be made flexible to permit opening of the vacuum poppet once the atmospheric poppet is seated.

From the foregoing description of the preferred embodiment of the invention, it will be apparent that the objects heretofore enumerated as well as others have been accomplished. While the preferred embodiment has been shown and described in considerable detail, the invention is not limited to the particular construction shown and described; and it is my intention to cover hereby all adaptations, modifications and uses thereof which come within the practice of those skilled in the art to which the invention relates.

I claim:

1. In valve structure for controlling fluid pressure servo-motors and the like: a body member having a valve chamber therein; a movable partition member in said valve chamber separating a first pressure chamber from a control pressure chamber, said movable partition member comprising a movable wall portion connected to valve means for controlling communication between said pressure chambers; and a movable valve control member for closing off at least a portion of said movable wall from a second pressure chamber while continuing to expose at least a portion of said movable wall to said control pressure chamber, and whereby said last mentioned portion of said movable wall opposes forces across said valve means to produce a valve balancing effect.

2. In valve means for controlling fluid pressure servo-motors and the like: a body member having a valve chamber therein; a radially inwardly projecting valve seat in said chamber; an annular spool-shaped valve member in said chamber forming a first annular pressure chamber with respect to the side walls of said valve chamber, said spool-shaped member having a first radially extending portion adapted to provide a seal with respect to said valve seat to control flow communication between said first pressure chamber and a control chamber and which seal is opened by rearward movement of said spool-shaped member, said spool-shaped member also having a radially extending movable wall portion spaced forwardly of said first portion and sealingly engaging the side walls of said valve chamber; and a movable control member adapted to move said spool-shaped member rearwardly, said control member being positioned forwardly of said movable wall portion of said spool-shaped valve member and constructed to cover and close off at least a portion of said movable wall portion from a second pressure chamber positioned forwardly of said first pressure chamber while exposing at least a portion of said movable wall to said control chamber.

3. In valve means for controlling fluid pressure servo-motors and the like: a body member having a valve chamber therein; a radially inwardly projecting valve seat in said chamber; an annular spool-shaped valve member in said chamber forming a first annular pressure chamber with respect to the side walls of said valve chamber, said spool-shaped member having a first radially extending portion adapted to provide a seal with respect to said valve seat to control flow communication between said first pressure chamber and a control chamber, which seal is opened by rearward movement of said spool-shaped member, said spool-shaped member also having a radially extending diaphragm portion spaced forwardly of said first portion and sealingly engaging the side walls of said valve chamber; and a movable control member adapted to move said spool-shaped member rearwardly, said control member being positioned forwardly of said diaphragm portion of said spool-shaped valve member and constructed to cover and close off at least a portion of said diaphragm portion from a second pressure chamber positioned forwardly of said first pressure chamber while exposing at least a portion of said diaphragm to said control chamber.

4. In valve means for controlling fluid pressure servo-motors and the like: a body having a valve chamber therein; a radially inwardly projecting valve seat in said chamber; an annular spool-shaped valve member in said chamber forming a first annular pressure chamber with respect to the side walls of said valve chamber, said spool-shaped member having a first radially extending portion adapted to provide a seal with respect to said valve seat to control flow communication between said first pressure chamber and a control chamber, which seal is opened by rearward movement of said spool-shaped member, said spool-shaped member also having a radially extending diaphragm portion spaced forwardly of said first portion and sealingly engaging the side walls of said valve chamber; and a movable control member adapted to move said spool-shaped member rearwardly, said control member being positioned forwardly of said diaphragm portion of said spool-shaped valve member and having a yieldable flanged portion constructed to close off at least a portion of said diaphragm portion from a second pressure chamber positioned forwardly of said first pressure chamber while exposing at least a portion of said diaphragm to said control chamber, and whereby the yielding of said yieldable flanged portion permits continued movement of said control member to move said first radially extending portion of said spool-shaped member from said valve seat after said yieldable flanged portion engages said diaphragm.

5. In a valve means for controlling fluid pressure servo-motors and the like: a body member having a first pressure chamber, a second pressure chamber and a control pressure chamber; a first valve seat separating said first chamber from said control chamber; a valve closure member for abutment with said valve seat; diaphragm means for separating said first and second pressure chambers and positioned oppositely to said closure member; means connecting said valve closure member and said diaphragm means such that the pressure forces on said closure member and said diaphragm means oppose each other; means providing a second generally fixed valve seat surrounding said diaphragm means for controlling communication of said second pressure chamber with said diaphragm means; a control member positioned in said second pressure chamber for movement toward and away from said diaphragm means and for abutment with one of said means to lift said valve closure member from said first valve seat; a flexible cup-shaped member on said control member for abutment with said second valve seat to close off said second pressure chamber from said diaphragm means prior to abutment of said control member with said one of said means; means communicating the space between said cup-shaped member and said diaphragm means to said control chamber; means biasing said control member away from said diaphragm means; and a stiffening plate on the side of said cup-shaped member adjacent said diaphragm means for lifting said cup-shaped member from said second seat when said control member moves away from said diaphragm means.

6. In valve means for controlling fluid pressure servo-motors and the like: a body member having an opening therein one end of which communicates with a control chamber, said body member having an annular valve seat in said opening facing toward said control chamber; an annular spool-shaped member in said opening, said spool-shaped member having a first flexible flange portion the radially outer edges of which are in sealing engagement with the side walls of said opening, and having a second relatively stiff flange portion for abutment with said valve seat, said spool-shaped member forming a first valve pressure chamber with respect to the side walls of said opening, and the opposite end of said opening from said control chamber communicating with a second valve pressure chamber; means providing a second generally fixed valve seat surrounding said flexible flange portion between said flexible flange portion and said second valve pressure chamber; a control member positioned in said second valve pressure chamber for movement toward and away from said spool-shaped member and for abutment with said spool-shaped member to lift said second flange from its valve seat; a flexible cup-shaped member on said control member for abutment with said second valve seat before said control member abuts said spool-shaped member; reaction means on the side of said first valve seat adjacent said control chamber; means extending through the center opening of said spool-shaped member for transmitting reaction force from said reaction means to said control member; and a stiffening plate on the side of said cup-shaped member adjacent said spool-shaped member for lifting said cup-shaped member from said second valve seat when said control member moves away from said spool-shaped member.

References Cited in the file of this patent

UNITED STATES PATENTS

| | | |
|---|---|---|
| 2,667,861 | Rockwell | Feb. 2, 1954 |
| 2,685,170 | Price | Aug. 3, 1954 |
| 2,690,740 | Hupp | Oct. 5, 1954 |

UNITED STATES PATENT OFFICE
CERTIFICATE OF CORRECTION

Patent No. 2,857,887                              October 28, 1958

Richard H. Rosback

It is hereby certified that error appears in the printed specification of the above numbered patent requiring correction and that the said Letters Patent should read as corrected below.

Column 5, line 70, after "body" insert -- member --.

Signed and sealed this 5th day of May 1959.

(SEAL)
Attest:

KARL H. AXLINE
Attesting Officer

ROBERT C. WATSON
Commissioner of Patents